July 28, 1959 M. E. HODGES 2,897,413
IMPEDANCE CHANGING CIRCUIT
Filed May 24, 1956
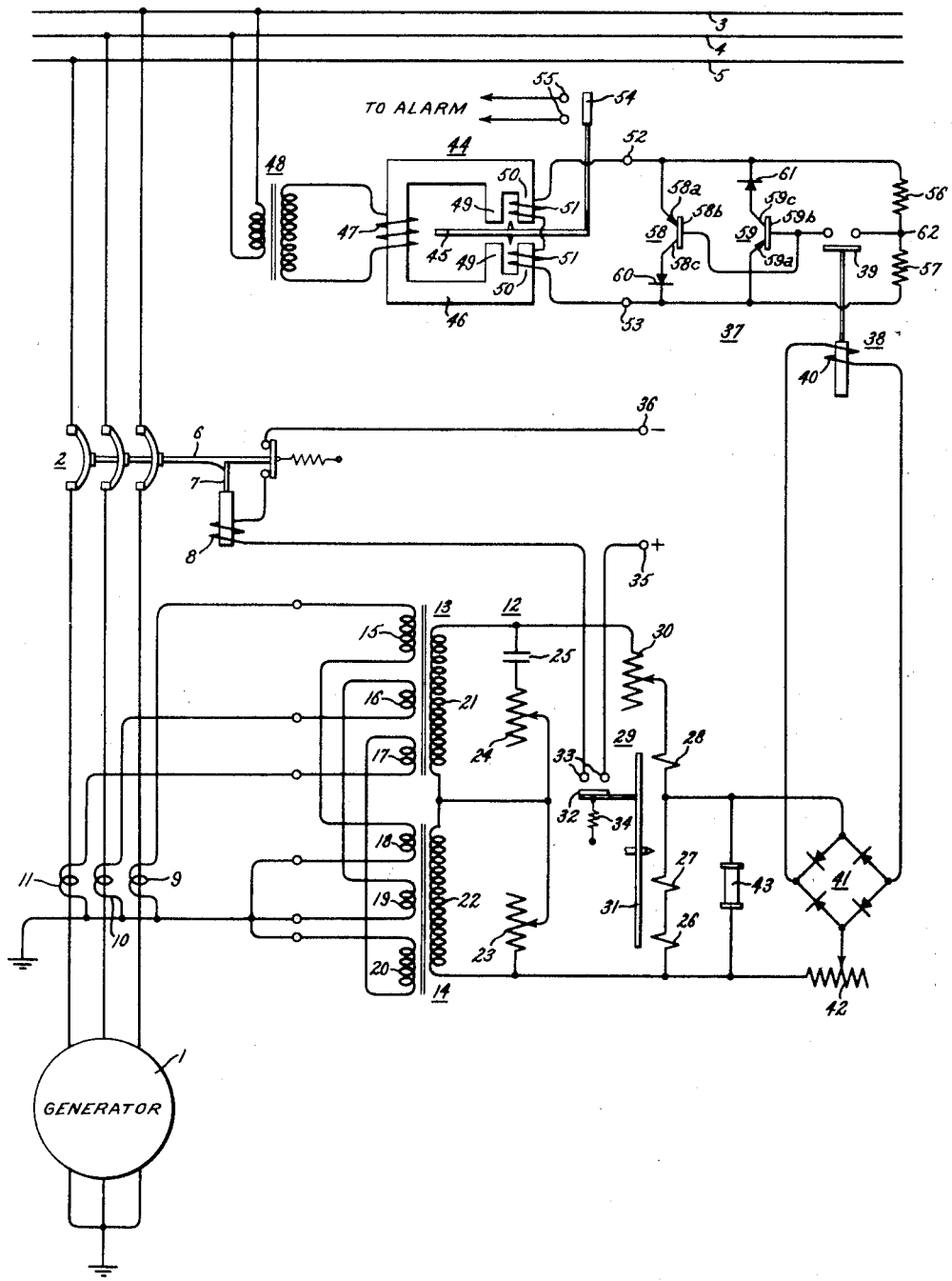
Inventor:
Merwyn E. Hodges,
by J. Wesley Kantner
His Attorney.

United States Patent Office 2,897,413
Patented July 28, 1959

2,897,413

IMPEDANCE CHANGING CIRCUIT

Merwyn E. Hodges, Philadelphia, Pa., assignor to General Electric Company, a corporation of New York Application May 24, 1956, Serial No. 587,018

6 Claims. (Cl. 317—148.5)

This invention relates to impedance changing circuits and more particularly to a circuit for selectively shunting predetermined impedance elements. An impedance changing circuit in accordance with the present invention may be employed advantageously as an element of a sensitive alarm unit in a negative-phase-sequence-overcurrent relay for protecting synchronous machines, and it is this particular application of the circuit which has been set forth in detail for illustrative purposes hereinafter.

Whenever a 3-phase alternating current generator is subjected to unbalanced load or unbalanced fault conditions, the generator stator current will include a negative-phase-sequence component which produces abnormal rotor heating. This undesirable heating effect can be expressed in terms of negative-phase-sequence current and of time, and consequently negative-phase-sequence-overcurrent relays have been designed to respond to these quantities and to initiate preselected protective functions.

A generator may operate normally with slightly unbalanced phase currents due to certain system conditions such as untransposed transmission lines. Above the maximum permissible degree of unbalance, but below an immediately harmful degree, it is often desirable to obtain an alarm indication before performing the ultimate protective function. Accordingly, sensitive alarm units are provided in negative-phase-sequence relays to respond at a lower level of negative-phase-sequence current than is required to initiate automatic protective functions. Such alarm units should operate with time delay to override unbalanced conditions of a transient nature.

The conventional sensitive auxiliary electromagnetic relays capable of responding to relatively low levels of negative-phase-sequence current, such as required for alarm unit application, are potentially unreliable. There is a tendency for the relay contacts to weld when called upon to close a circuit in which even a small magnitude of current flows. Due to the very small amount of energizing power available for producing operating torque in the relay, such a welding tendency may adversely affect the accuracy and consistency of relay operation, and an undesirable wide discrepancy between the pickup and dropout levels of energization is likely to develop.

Accordingly, it is a specific object of this invention to provide an improved circuit arrangement for use in an alarm unit of a negative-phase-sequence overcurrent relay, whereby time delayed alarm operation can be reliably controlled by means of a sensitive auxiliary relay whose contacts close a signal circuit having only negligible current carrying requirements.

It is a general object of the invention to provide an impedance changing circuit wherein impedance values are changed by controlling a circuit which conducts signal current of extremely low magnitude.

In carrying out my invention in one form, a suitable circuit controlling induction-disk time delay relay is provided with magnetically coupled operating and shading windings. The operating winding is energized from a source of substantially constant alternating current. The shading winding, which is used to retard a component of the magnetic flux produced by the alternating current in the operating winding in order to develop operating torque in the induction disk, is connected to a pair of series connected impedance elements having sufficient impedance effectively to open circuit the shading winding and thereby render it ineffective to perform its flux retarding function. I connect in parallel relationship across these impedance elements a pair of reversely oriented emitter-collector circuits formed by the emitter and collector electrodes of a pair of transistors. Suitable blocking means prevents current flow in the low-impedance direction between the collector and base electrodes of each transistor. Switching means is provided to connect the base electrodes of the transistors to the common connection between the series connected impedance elements thereby establishing two circuits for alternately conducting control current of extremely low magnitude during succeeding half cycles of the voltage which is induced in the shading winding as a result of alternating current in the operating winding.

Control current in the emitter-base junctions of the transistors will render the emitter-collector circuits highly conductive, and these parallel circuits provide shunt paths of relatively low alternating-current impedance around the series connected impedance elements thereby rendering the shading winding effective to retard a component of magnetic flux. By furnishing sensitive switching means to control the control current circuits as described above, and by energizing the switching means in accordance with negative-phase-sequence current flowing in the stator of a 3-phase alternating current generator, a reliable alarm unit is obtained for indicating unbalanced current conditions in the generator.

My invention will be better understood and further objects and advantages will be apparent from the following description taken in conjunction with the accompanying drawing in which the single figure is a schematic representation of a protective relaying system employing a preferred embodiment of my invention.

Referring now to the drawing, an alternating current generator 1 of the 3-phase Y-connected grounded neutral type is connected through a circuit interrupter 2 to an electric power transmission system represented by lines 3, 4, and 5. Circuit interrupter 2 includes a switch arm 6 shown in its closed circuit position, a latch member 7 to hold arm 6 closed, and a trip coil 8 for releasing latch 7 when energized.

When the generator 1 is subjected to an unbalanced fault or load, its stator current includes a negative-phase-sequence component. This negative-phase-sequence current sets up a counter-rotating flux field in the machine which causes double frequency currents to flow in the rotor iron and slot wedges thereby resulting in excessive local heating. Such heating effect in the rotor can be expressed as a function of the negative-phase-sequence current and of time. Hence the ideal relay for the protection of the generator against unbalanced faults is one which responds only to the negative-phase-sequence component of generator current and has a time characteristic parallel to but slightly lower than the heating characteristic of the generator.

Although any suitable negative-phase-sequence relay may be used, the one which has been shown in the drawing for the sake of illustration comprises an improved relay as described and claimed in the copending patent application S.N. 390,020 filed by W. C. Morris on November 3, 1953, and assigned to the present assignee. In accordance with said copending application, three Y-connected current transformers 9, 10 and 11 are coupled to the 3-phase circuit connecting generator 1 to lines 3, 4 and 5, and these current transformers supply a negative-phase-sequence filter network indicated generally by the refeernce numeral 12. This network comprises two auxiliary transformers 13 and 14 each having three primary windings, 15, 16, 17 and 18, 19, 20 respectively. As shown in the drawing, primary windings 15 and 20 are each disposed in reverse phase relationship with respect to the two associated primary windings and are each provided with twice the number of turns as each associated winding. Windings 15 and 18 are connected in series circuit relationship to current transformer 9, windings 16 and 19 are connected in series circuit relationship to current transformer 10, and windings 17 and 20 are connected in series circuit relationship to current transformer 11. The single secondary windings 21 and 22 of auxiliary transformers 13 and 14 respectively energize a resultant voltage phase shifting impedance network comprising a variable resistor 23 connected across winding 22 and another variable resistor 24 connected in series with a capacitor 25 across winding 21.

As shown schematically in the drawing, three windings 26, 27 and 28 of an electromagnetic protective relay 29 are connected in series circuit relationship with still another variable resistor 30 across the resultant voltage phase shifting impedance network 23, 24, 25. Windings 26 and 27 are the lower operating windings and winding 28 is the upper operating winding of a conventional induction-disk wattmetric type relay, and energization of these windings sets up operating torque in a rotatable induction disk 31. A movable switch contact 32 is disposed on induction disk 31 in cooperating relationship with a stationary switch contact 33, and whenever the operating torque in disk 31 exceeds the restraining force of suitable biasing means such as a spring 34, the disk moves with time delay to carry contact 32 into engagement with contact 33. Stationary switch contact 33 when engaged by movable contact 32 completes a circuit which connects trip coil 8 of circuit interrupter 2 for energization to a suitable source of direct voltage represented by terminals 35 and 36. In the aforesaid Morris copending application it is shown that the illustrated negative-phase-sequence filter network 12 energizes the relay operating windings 26, 27, 28 in accordance with the negative-phase-sequence component of generator current. Whenever the negative-phase-sequence component exceeds a predetermined magnitude for a predetermined time, the protective relay 29 will respond as described above to trip circuit interrupter 2.

It is frequently desirable to indicate by an alarm that the generator 1 is subjected to negative-phase-sequence current of a magnitude below that required to operate the protective relay 29, and an alarm unit is provided for this purpose. The alarm unit, which is generally identified in the drawing by reference number 37, includes a sensitive electromagnetically operated switching means 38. Switching means 38 has a normally open switch contact 39 and an operating coil 40 for closing contact 39 when energized by a relatively small amount of direct-current power. Coil 40 is connected to the D.-C. terminals of a full-wave bridge type rectifier 41 whose A.-C. terminals in series with an adjustable resistor 42 are connected across the lower windings 26 and 27 of relay 29. Thus coil 40 is energized in accordance with the negative phase sequence component of generator current. Resistor 42 is adjusted whereby switching means 38 operates in response to less negative phase sequence current than required to operate protective relay 29. A suitable circuit element 43 having a negative voltage-resistance characteristic is connected across the lower windings 26 and 27 to protect rectifier 41 from damaging votlage surges which may occur during a severe unbalanced fault condition.

The actual alarm indication preferably should be delayed after switching means 38 operates so as to prevent an unnecessary alarm during temporarily unbalanced conditions. To obtain the desired time delay, an induction-disk type relay 44 is provided. This relay comprises a rotatable induction element or disk 45 disposed for movement between opposing poles of a magnetizable frame 46. Suitable means, such as a permanent magnet, not shown, is provided to retard the movement of disk 45 and thus ensure delayed operation. An operating winding 47 on frame 46 is energized by alternating current which, as illustrated in the drawing by way of example, can be derived from the electric power transmission system by means of a potential transformer 48. The opposing poles of frame 46 are arranged to provide two parallel paths for the alternating magnetic flux produced by operating winding 47. One path 49 is unshaded, while the other path 50, as is shown in the drawing, is encircled by a pair of series connected shading windings 51. The shading windings are linked by a portion of the magnetic flux produced by alternating current in operating winding 47, and in accordance with Faraday's law, an alternating voltage is induced in these windings.

The shading windings 51 are connected to two terminals 52 and 53. As long as the windings are effectively open circuited, no current can flow and the magnetic flux encompassed thereby is unaffected. But as soon as a current conducting circuit is connected across terminals 52 and 53, a complete circuit is established and the voltage induced in shading windings 51 will cause current to circulate, the magnitude of current being determined by the resistance of the windings themselves and the impedance of the external circuit connected to terminals 52 and 53. As is well known to those skilled in the art, it is this current in the shading windings and the flux produced thereby that renders the windings effective to retard the component of magnetic flux in path 50 with respect to the component of magnetic flux in the unshaded path 49. Thus the magnetic flux produced by operating winding 47 is divided into two out-of-phase components. The interaction of these two out-of-phase flux components in induction disk 45 produces driving torque to rotate the disk and carry a movable switch contact 54 from its reset position shown in the drawing into engagement with a pair of stationary switch contacts 55. Contacts 55 are connected in the alarm circuit, not shown.

It has been found that the contact 39 of switching means 38 cannot be successfully employed directly to complete the circuit between terminals 52 and 53 when alarm unit operation is desired. In one application it was determined that such direct switching required the making of approximately .02 amperes at 28 volts, and this switching duty resulted in an undesirable welding tendency by the contacts of the sensitive switching means 38. Accordingly, a special impedance changing circuit is used to initiate operation of relay 44.

As shown in the drawing, an impedance circuit comprising a pair of series connected impedance elements 56 and 57 is connected across terminals 52 and 53. The impedances of the two elements 56 and 57 are substantially equal to each other, and the total circuit impedance to alternating current supplied from terminals 52 and 53 is selected to be relatively high thereby limiting to a negligible magnitude the alternating current flowing in shading windings 51 as a result of the voltage induced therein. In other words, impedance elements 56 and 57 are effectively an open circuit as far as shading windings 51 are concerned, and the magnetic flux in path 50 of frame 46 remains in phase with the flux in path 49. As a result, movable switch contact 54 remains in its reset position.

To reduce the impedance connected across terminals 52 and 53 when alarm unit operation is desired, a pair of semiconductor devices or transistors 58 and 59 are used. Although any of various well known types may be used for the purpose of this invention, I have shown for the sake of illustration transistors of the N-type. Transistors 58 and 59 are provided with emitter electrodes 58a and 59a respectively, base electrodes 58b and 59b respectively, and collector electrodes 58c and 59c respectively. The emitter-collector circuits of these transistors are connected in parallel, reversely oriented shunting relationship to the series connected impedance elements 56 and 57. More specifically, the emitter electrode 58a is connected to terminal 52 while emitter electrode 59a is connected to terminal 53, and the collector electrodes 58c and 59c are coupled to the opposite terminals by unidirectional electric valves or rectifiers 60 and 61 respectively. The rectifiers 60 and 61 are poled to block current flow in the low-impedance direction in the collector-base junction of each transistor. The low-impedance direction for the N-type transistor illustrated is from collector to base. The base electrodes 58b and 59b are both coupled by means of switch contact 39 to an intermediate point of the impedance circuit connected across terminals 52 and 53, that is, to the common connection 62 between the series connected impedance elements 56 and 57.

As long as switch contact 39 is open, the impedance of the emitter-base-collector circuit of each transistor is very high, and the resultant impedance of the parallel circuits connected to terminals 52 and 53 is not appreciably lower than the impedance of elements 56 and 57 alone. This is due to the nature of the illustrated N-type transistors 58 and 59 whose collector-base junctions inherently present high resistance to current flowing from base to collector and whose emitter-base junctions inherently present high resistance to current flowing from base to emitter. By closing switch contact 39, however, the base electrodes 58b and 59b are connected to point 62, and a closed control circuit is established for each transistor. Control current can flow from terminal 52, through the emitter-base junction of transistor 58 in the low-impedance direction, and through impedance element 57 to terminal 53 without traversing any transistor junction in a high-impedance direction. Similarly, control current can flow from terminal 53 to terminal 52 through the corresponding control circuit of transistor 59. The flow of only a small magnitude of control current in the low-impedance direction in the emitter-base junction of a transistor operates to offset significantly the impedance of the associated collector-base junction. A small increment in control current causes a large reduction in the magnitude of impedance presented to current flowing from base to collector.

With contact 39 closed and the polarity of the voltage induced in shading windings 51 such that terminal 52 is positive with respect to terminal 53, the control current in transistor 58 will lower the impedance of the collector-base junction 58c—58b sufficiently to allow a relatively large amount of current to be shunted through the emitter-collector circuit 58a—58c around the series connected impedance elements 56 and 57. During the succeeding half cycle of induced voltage in windings 51, a similar action takes place in the parallel, reversely oriented transistor 59. Thus, the two transistors now provide parallel asymmetric reversely poled current conducting paths of very low alternating-current impedance and high admittance, and the shading windings 51 are rendered effective to perform their flux retarding function. Operating torque is developed in induction disk 45 and switch contact 54 moves with time delay toward the stationary contacts 55. The impedance of each impedance element 56 and 57 is preselected so that the magnitude of control current in each control circuit is sufficiently low to enable switch contact 39 to control this circuit without tending to weld, whereby the sensitive switching means 38 will operate accurately and with reliability. On the other hand, the magnitude of control current must not be so small as to produce in the collector-base junction an insufficient impedance change for the purpose of rendering shading windings 51 effective to retard magnetic flux. It has been found in one application that a control current of less than .001 ampere will enable a satisfactory amount of current (approximately .014 ampere) to flow in the shading windings. The rectifiers 60 and 61 ensure that the low-impedance direction of the collector-base junction of one transistor does not divert control current from the parallel connected emitter-base junction of the control circuit of the adjacent transistor.

While I have shown and described a preferred form of my invention by way of illustration, many modifications will occur to those skilled in the art. I therefore contemplate by the claims which conclude this specification to cover all such modifications as fall within the true spirit and scope of my invention.

What I claim as new and desire to secure by Letters Patent of the United States is:

1. In combination, a pair of alternating voltage supply terminals, an impedance connected across said terminals, a pair of transistors each having an emitter, a collector and a base, the emitter-collector circuits of said transistors being connected reversely in parallel across said terminals, a separate rectifier connected in the collector circuit of each transistor poled to block current in the low-impedance direction between associated collector and base, and switching means for connecting the bases of said transistors to an intermediate point of said impedance to establish across said terminals two asymmetric reversely poled relatively low impedance conducting paths.

2. An impedance changing circuit comprising, a pair of alternating current supply terminals, a circuit of relatively high impedance connected across said terminals, two transistors each having an emitter electrode, a collector electrode and a base electrode, the associated emitter and collector electrodes of said transistors forming two emitter-collector circuits, circuit means coupling said emitter-collector circuits in parallel, reversely oriented relationship across said supply terminals, a pair of unidirectional electric valves each connected in series relationship to a different collector electrode for blocking current flow in the low-impedance direction between the collector electrode and associated base electrode, and switching means to connect the base electrodes of both of said transistors to an intermediate point of said high impedance circuit thereby completing two alternately conducting control circuits, whereby each of said parallel, reversely oriented emitter-collector circuits presents relatively low impedance to opposite half cycles of alternating current.

3. A shunting circuit comprising, a pair of alternating current supply terminals, a pair of impedance elements connected in series circuit relationship across said terminals for providing relatively high impedance to alternating current, two transistors having emitter-collector, collector-base and emitter-base circuits, circuit means coupling said emitter-collector circuits in parallel, reversely oriented relationship across said series connected impedance elements, a pair of rectifiers each connected in a different one of said emitter-collector circuits for blocking current in the low-impedance direction in the associated collector-base circuit, and switching means connecting said emitter-base circuits to the common connection between said impedance elements to provide closed circuits for conducting control current which operates to increase the alternating-current admittance of the parallel emitter-collector circuits.

4. An impedance changing circuit comprising, a pair of alternating current supply terminals, a pair of impedance elements connected in series circuit relationship to said terminals, two transistors each having an emitter, a collector and a base, circuit means coupling the emitters of said transistors to different supply terminals and coupling the collectors of said transistors to opposite supply terminals, a pair of unidirectional electric valves each connected to a different collector and disposed to block current flow in the low-impedance direction between the collector and its associated base, and switching means to connect the bases to the common connection between said impedance elements thereby establishing a control circuit for each transistor, whereby control currents are alternately conducted during succeeding half cycles of alternating current to decrease the alternating-current impedance of the circuits connected to said supply terminals.

5. A shunting circuit comprising, a pair of alternating current supply terminals, a pair of impedance elements connected in series circuit relationship across said terminals, two transistors each having an emitter electrode, a collector electrode and a base electrode, first circuit means connecting the emitter electrode of one of said transistors to one of said supply terminals and connecting the emitter electrode of the other transistor to the other supply terminal, second circuit means including two unidirectional electric valves for connecting the collector electrode of said one transistor to said other supply terminal and for connecting the collector electrode of said other transistor to said one supply terminal, said electric valves being arranged to block current flow in the low-impedance direction in each collector-base junction, and switching means to connect the base electrodes to the common connection between said impedance elements thereby enabling the emitter-base junctions of said transistors to conduct control currents for said transistors, whereby the emitter-collector circuits of said transistors provide shunt paths around said impedance elements for opposite half cycles of alternating current.

6. An electromagnetic relay comprising, a rotatable circuit controlling induction element, a magnetizable frame, an operating winding disposed on said frame and energized by alternating current for producing alternating magnetic flux, a shading winding disposed on a portion of said frame and magnetically coupled to said operating winding, a pair of impedance elements connected in series circuit relationship with said shading winding for limiting to a negligible magnitude the current flowing in said shading winding as a result of the voltage induced therein by said alternating magnetic flux, two transistors each having an emitter electrode, a collector electrode and a base electrode, the associated emitter and collector electrodes of said transistors forming two emitter-collector circuits each including a rectifier connected to the collector electrode to block current flow in the low-impedance direction between the collector and associated base electrodes, circuit means connecting said emitter-collector circuits in parallel, reversely oriented shunting relationship to said series connected impedance elements, and switching means connecting the base electrodes of said transistors to the common connection between said impedance elements to establish for each transsistor a control circuit wherein control current flows during alternate half cycles of the voltage induced in said shading winding, whereby said emitter-collector circuits provide shunt paths of relative low impedance for opposite half cycles of current flowing in said shading winding and as a result said shading winding effectively divides the magnetic flux into out-of-phase components which interact in said induction element to produce operating torque.

References Cited in the file of this patent
UNITED STATES PATENTS

| | | |
|---|---|---|
| 1,204,508 | Smith | Nov. 14, 1916 |
| 2,403,637 | Christie | July 9, 1946 |
| 2,681,429 | Long | June 15, 1954 |
| 2,751,550 | Chase | June 19, 1956 |
| 2,781,479 | Rice | Feb. 12, 1957 |